United States Patent [19]
Altman et al.

[11] 3,792,373
[45] Feb. 12, 1974

[54] METALLIC VAPOR LASER ASSEMBLY

[75] Inventors: Daniel E. Altman; Glidden J. Barstow; Myer Geller, all of San Diego, Calif.

[73] Assignee: The United States of America as represented by the Secretary of the Navy, Washington, D.C.

[22] Filed: July 21, 1972

[21] Appl. No.: 274,126

[52] U.S. Cl. .................. 331/94.5, 330/4.3, 313/217, 313/220, 313/227
[51] Int. Cl. .......................... H01s 3/02, H01s 3/22
[58] Field of Search ..... 331/94.5; 330/4.3; 313/217, 313/220, 227

[56] References Cited
UNITED STATES PATENTS

| | | | |
|---|---|---|---|
| 3,576,500 | 4/1971 | Gould | 331/94.5 |
| 3,613,027 | 10/1971 | Westermeier | 331/94.5 |
| 3,562,662 | 2/1971 | Gould et al. | 331/94.5 |

OTHER PUBLICATIONS

Silfuast et al., "Applied Optics," Vol. 9, No. 6, June 1970, pp. 484–485.

Primary Examiner—Ronald L. Wibert
Assistant Examiner—R. J. Webster
Attorney, Agent, or Firm—R. S. Sciascia; G. J. Rubens; J. W. McLaren

[57] ABSTRACT

A metallic vapor laser assembly has an enclosed central section of tubular heat-resistant material in which a selected metallic element may be maintained in its vapor state and also in contact with an electrode at each end; the electrodes are connected to a source of electrical energy to raise the metallic vapor to a state of excitation causing laser energy emission. A first pair of suitably transmissive windows maintained at an elevated temperature, are positioned to retain the metallic vapor in the central section. A second pair of windows which may be preferably positioned at the Brewster angle, are supported outwardly along the axis of the laser energy emission defining closed end sections which are contiguous to the closed central section; the end sections are evacuated to facilitate maintaining the second set of windows at a temperature substantially lower than the elevated temperature of the central section and the first pair of windows, and to prevent leakage of air past the inner set of windows into the enclosed central section containing the metal vapor.

7 Claims, 2 Drawing Figures

METALLIC VAPOR LASER ASSEMBLY

BACKGROUND OF THE INVENTION

There is considerable interest in the development of increased efficiencies of high power lasers operating in the blue-green region of the spectrum, principally for the reason that the blue-green region of the spectrum provides the best light energy transmissivity in sea water. The attenuation characteristics of sea water are such that light energy losses are minimized at wavelengths varying from about 4,700A in deep ocean water to approximately 5,000A in coastal waters. Accordingly, highly efficient lasers operating in this spectral region are very desirable.

Metallic vapor lasers such as copper, thallium, and bismuth, for example, operate in approximately the most desirable spectral region and hold the promise of developing into more efficient high power lasers operating in the blue-green region of the spectrum.

The precise relationship between gas pressure, gain and power output in pulsed gas lasers, such as the metallic vapor lasers, has not been completely established. However, some factors appear to be significant; for example, electron temperature is dependent upon the particular relationship of the electrical field, E, to the vapor pressure, P, in any particular environment and determines excitation efficiency. Additionally, the breakdown rate of the gas is dependent on the ratio E/P and determines the degree of population inversion. Experience with nitrogen and neon pulsed lasers indicates that pressures in the range of 10 to 30 torr for nitrogen and 1 to 5 torr for neon produce maximum outputs. Accordingly, it may be expected that optimum pressures for metallic gas lasers would be approximately in the 1 to 30 torr range.

The temperature at which a metallic vapor laser operates provides one convenient parameter for controlling the vapor pressure. As with any liquid-vapor system, the temperature at the surface of the liquid phase determines the pressure of the vapor phase. The temperature of the coolest spot on the wall of a metallic vapor laser assembly therefore becomes the temperature of the liquid phase and hence is determinative of the vapor pressure throughout the tube.

If the coolest spot on the interior of a metallic vapor laser assembly is on the window, as it was in many prior art equipments, the efficiency of the laser may be seriously impaired due to the attenuation of the emitted laser energy as a result of the obscuration of the windows. Accordingly, the materials and sealing techniques for the windows are desirably chosen as to permit the windows to operate at the same or slightly higher temperature than the interior of the assembly.

At typical temperatures of from 800°C to 1,000°C for metallic vapor laser assemblies, the selection of window materials and sealing methods becomes difficult. In the prior art these problems have been met, or avoided to a degree at least, by filling the interior of the metallic vapor laser tube with an inert gas such as argon, helium, or neon, etc. to a pressure of several torr; the windows were then operated at or near room temperature and separated from the hot portion of the assembly by a distance which was long compared to the mean free path in the inert gas within the assembly.

In this arrangement the metal vapor atoms diffusing out of the hot portion of the assembly collide with the inert gas atoms and eventually also collide with the cooler portion of the assembly wall adjacent to the windows where they remain as a deposit on the interior surface of the assembly. This technique and arrangement has several highly undesirable deficiencies, however.

Firstly, under some conditions i.e., large excitation and low vapor pressures, the inert gas takes part in the discharge process, causing the dissipation of a portion of the excitation power which would otherwise be available to produce the emission of laser energy. Secondly, since such a system inevitably involves the flow of material in the form of vapor from some source in the hot zone to the point where it clings to the interior walls at or near the cooler zone, a vapor pressure gradient tends to exist along the interior of the apparatus, thereby precluding precise control of the operating vapor pressure.

Additionally, unless some method is devised to return the deposited material to the reservoir whence it originated, the useful operative life of the apparatus is limited to that time which it takes for the material to diffuse from the reservoir to the area where it becomes deposited upon the interior of the assembly.

Another prior art method which has been used to minimize the high temperature window problem has been to introduce the metal into the interior of the apparatus as a compound having a higher vapor pressure than a metal alone would have. This technique has been in use for some time in metal vapor lamp construction, such as the mercury vapor/thallium iodide lamps, for example. In this type of lamp the thallium iodide vapor is dissociated by the high temperature in the arc and is subsequently reformed as the thallium and iodide vapors diffuse to the relatively cooler walls on the interior of the apparatus.

However, when applied to laser operation, excitation would have to be caused by electron collision, since thermal excitation can never produce a population inversion. It is desirable that excitation and dissociation occur as the result of a single collision; however, the two processes may occur serially also.

An important consideration in the design of such an apparatus is the electrode configuration used to excite the metallic vapor within the short time-scale necessitated by the fluorescent lifetime of the particular excited state being used. In prior art gas lasers involving comparable considerations, such as nitrogen and neon, the electrodes were arranged along the sides of the tube so that the electric field was normal to the direction of light propagation. This was done to obtain the maximum possible electric field and minimum circuit inductance.

Unfortunately, however, the implementation of this type of configuration involves considerable difficulty with conventional vacuum sealing materials and techniques because of the large number of electrode seals required, and also due to the difficulty of assembling those seals located toward the central portion of the assembly. The design of such an assembly for operation at elevated temperatures therefore is not altogether feasible at this time.

Accordingly, it is highly desirable that a metal vapor laser be devised without the use of a buffer gas or other prior art expedients, to adequately deal with and eliminate the problem of the metal vapor condensing out on cold windows.

SUMMARY OF THE INVENTION

The present invention obviates some of the major problems of prior art metal vapor laser equipment by conceiving a metal vapor laser assembly which includes an enclosed central section maintained at an elevated temperature sufficient to retain a selected metallic element in its vapor state. Electrodes are provided at each end of the enclosed central section in contact with the metal vapor so that, when connected to an appropriate source of electrical energy, an electrical discharge can be generated between the electrodes, raising the metallic vapor to a state of excitation to cause laser energy emission.

The enclosed central section of the assembly, which is maintained at the elevated temperature, has a pair of first windows, one at or near each end of the enclosed central section; the first windows are operative at the elevated temperature, substantially transparent to the laser energy emission, and positioned to retain the metallic vapor between them.

Because the first windows are maintained near or at the elevated temperature, they are not subject to having the metallic vapor condense out upon them, undesirably obscuring their transmissivity and impairing the efficiency of the laser by reason of unwanted condensation of the metallic vapor at these critical areas.

The concept of the present invention inherently contemplates enclosed end sections, one at each end of the enclosed central section, and contiguous to the enclosed central section which is maintained at the elevated temperature. Second windows, which are also substantially transparent to the laser energy emission, are positioned outwardly from the first windows along the axis of the laser energy emission and, together with the first windows, define the enclosed end section.

These end sections are evacuated so that they form a temperature insulating portion of the assembly whereby the first windows may be operated at a desirable elevated temperature while the second windows may be operated at or near room temperature, i.e., substantially below the elevated temperature which may be typically of the order of 800°C to 1,000°C. Since the second windows are not in contact with the metallic vapor, no condensation collects on those outermost windows despite the fact that they are operated at or near room temperature.

Equally importantly, the evacuation of the end sections prevents leakage past the first or inner windows. Typically, the metallic vapor in the enclosed central section may be of the order of ten torr whereas normal atmospheric pressure is approximately seven hundred and sixty torr. Though the seals formed by the first or inner windows are excellent, they are not altogether perfect in the sense that some undesirable leakage will occur due to a large pressure differential of the order described. Therefore, substantial evacuation of the enclosed end sections reduces the pressure differential to about ten torr or less, virtually eliminating undesirable leakage past the second or innermost windows.

Preferably, the second windows are supported and positioned at the Brewster angle to permit the most efficacious transmission of the laser energy emission. In a preferred embodiment of the present invention, the first windows are retained in position by an appropriate spring-loaded means so as to avoid undue stress on the materials due to their operation at the elevated temperature and consequent expansion and contraction problems.

Additionally, in preferred embodiments of the present invention, the electrodes are in part hollow so that they may be water-cooled. Thus, the end of the electrode which is positioned away from the central hot region is provided with a flow of water or other appropriate coolant to carry off a significant portion of the heat generated by the operation of the metallic vapor laser and also to aid in the desired operation of the evacuated end portions which perform a heat insulating function.

Specific advantageous features of the preferred embodiment of the present invention include a hollow electrode in order to permit the passage of laser energy therethrough and an enclosed central section of the assembly which comprises circular tubing of selected heat-resistant material having a conical portion at each end configured to receive and bear against an end portion of one of the electrodes to seal the metal vapor within the central section operated at an elevated temperature.

The conical portion of each end of the circular tubing which comprises the enclosed central section of the metallic vapor laser assembly, preferably has a ground and polished inner surface to insure the best possible pressure seal; additionally, that portion of the electrode which bears against the conical surface is preferably of a hemispherical configuration so the two contiguous surfaces are joined in a "universal joint" type of arrangement to facilitate a good pressure seal while alleviating any problem involving stringent alignment requirements.

An additional feature of the preferred embodiment resides in the use of a conically shaped ring configured to be received between the inner conical portion at each end of the enclosed central section of the assembly and the spherically shaped end portion of each adjacent electrode. The conically shaped ring has a deformable annulus which conforms to the exact configuration of both the hemispherical and the conical surfaces against which it bears, facilitating the maintenance of a pressure-tight seal. In one of its simplest and most effective forms the deformable annulus on the conically shaped ring may comprise a ridged portion dimensioned to fit between the two bearing surfaces substantially in the manner of a small cross-sectional V-type annulus.

Accordingly, it is a primary object of the present invention to provide a metallic vapor laser assembly which obviates the problem of condensation on one or more windows of the assembly and eliminates the obscuration of those windows to thereby insure higher efficiency.

An equally important object of the present invention is to obtain such operation without the requirement of using a buffer gas, for example, or other prior art expedients.

Another important object of the present invention is to provide thorough insulation of the hot zone of operation of a metallic vapor laser assembly from its cold zone.

Yet another important object and aspect of the present invention is to provide metal-to-glass type pressure-tight seals which will withstand both elevated temperatures and the deleterious chemical actions of hot metallic vapors.

An additional object of the present invention is to significantly reduce undesired leakage into that portion of the assembly containing the metal vapor by minimizing the pressure differential across the windows which seal it.

A further object of the present invention is to provide thermal isolation of the hot portion of the metallic vapor laser assembly from its cold portion through the use of evacuated end portions of the assembly between respective pairs of hot windows and cold windows.

A still further object of the present invention is to provide cooling of the electrodes situated in the end portions of the metallic vapor laser assembly by the continuous circulation of a liquid coolant therethrough.

Yet another important object of the present invention is to provide metal-to-glass seals which are both efficacious and obviate the need for meeting stringent alignment requirements such as may result from expansion and contraction phenomena occurring in the operation of the assembly.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

Figure 1:
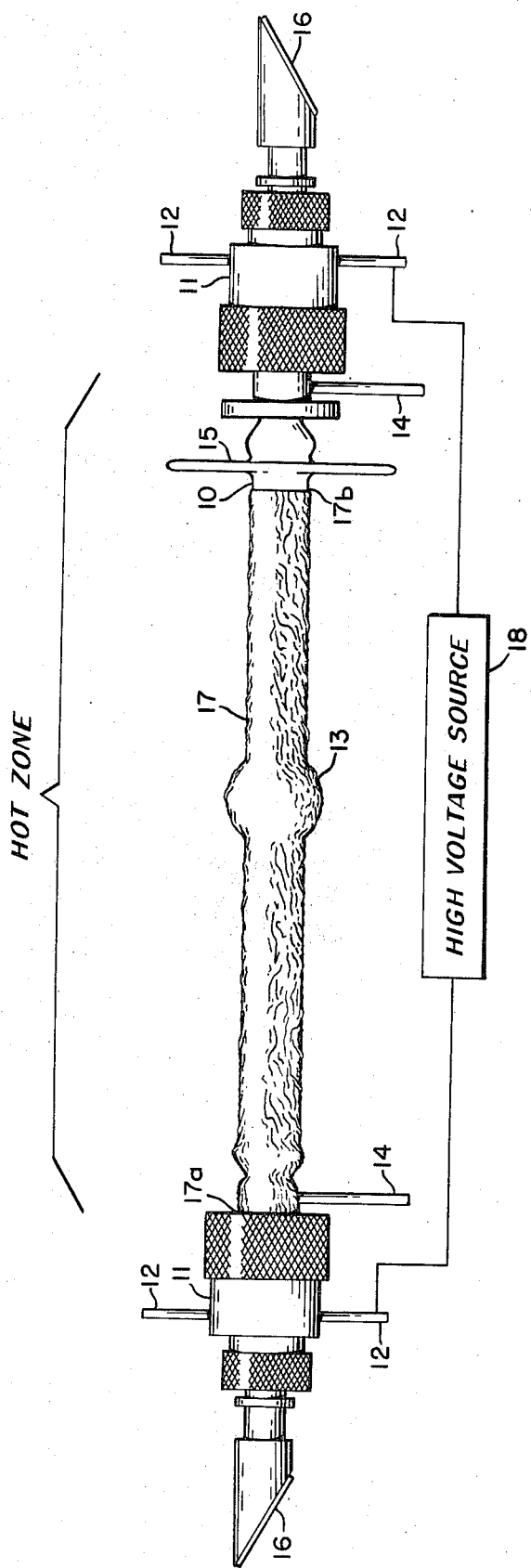
FIG. 1 is a side view illustration of an embodiment of the present invention.

FIG. 1 illustrates, in a partially schematic manner, an embodiment of the present invention. As shown, an elongate plasma tube 10 forms an enclosed central section of the metallic vapor laser. An electrode assembly 11 at each end of the enclosed central section of the assembly, includes ports 12 for admitting and discharging a suitable fluid coolant to maintain a desired temperature of the electrodes. The electrode assemblies 11 are illustrated in considerably more detail in the illustration of FIG. 2.

The enclosed central section of the plasma tube 10 may be fabricated of a suitable material such as quartz, for example, and includes an enlarged portion 13 at its center where the elemental metal for forming metal vapor may be placed.

Figure 2:
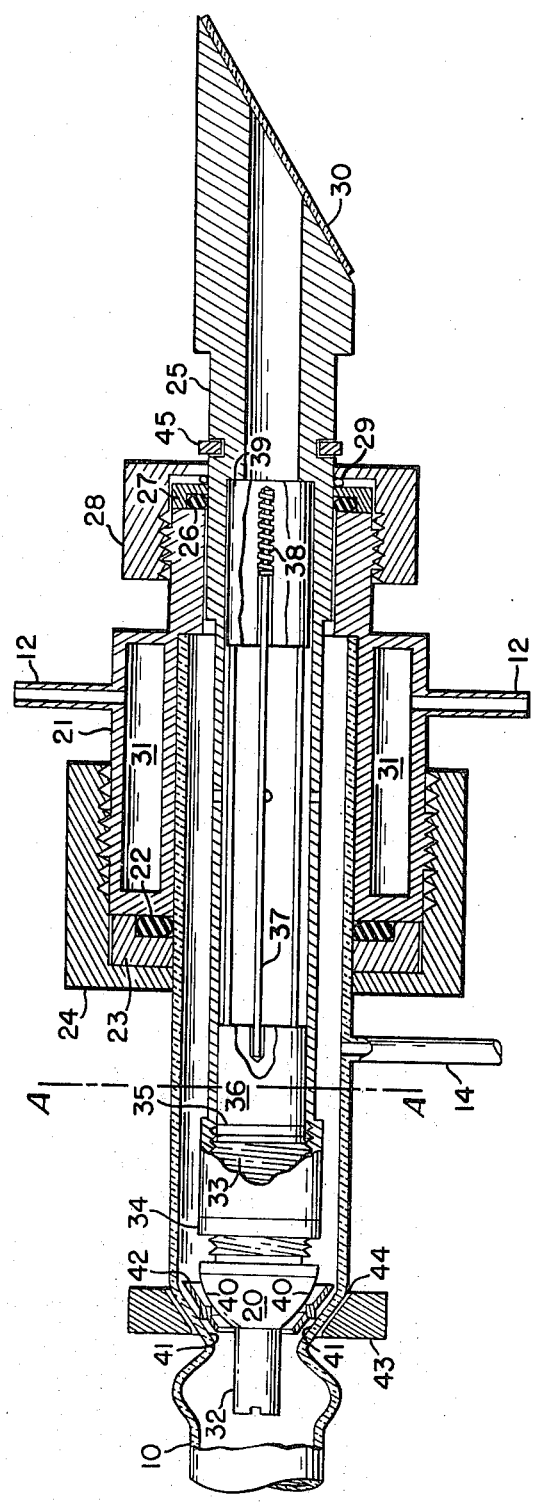
FIG. 2 is a detailed illustration of one of the end portions of a preferred embodiment of the present invention.

Connections 14 are provided to connect the extreme ends of the quartz tube 10 to a suitable vacuum system as will appear more fully from a subsequent description of the more detailed illustration of the end portions of the metallic vapor laser assembly as illustrated in FIG. 2. The connections 14 are in communication with enclosed end sections contiguous to each end of the enclosed central section 10 of the plasma tube, which end sections are separated from the enclosed central section of the plasma tube 10 by the use of suitable windows. The windows are highly transmissive of the laser energy emission and are operated at a hot or elevated temperature substantially that of the operative temperature of the enclosed central section of the plasma tube; as a consequence little or no metallic vapor condenses out upon the windows.

The major portion of the tube 10 may be advantageously covered with a close fitting jacket 17 fabricated of a suitable material, such as 1.5 mil platinum foil, which is securely connected to the left-hand electrode assembly 11 at 17a, extends to 17b, and is operative at ground or low potential. The right-hand electrode assembly 11 is the high potential electrode and is insulated from the grounded platinum jacket 17 by a quartz ring 15. The ring 15, which prevents arc over, may be an integral portion of the quartz plasma tube 10. A high voltage source of pulsed electrical energy 18 may be attached to the assembly by suitable clamping means placed around the body of the right-hand electrode assembly at 11, while the ground or low potential connection may be appropriately made to the end of the plasma tube jacket at 17b also by suitable clamping means. Suitable electrical connections are chosen to achieve the lowest inductance from the high voltage source 18 to these aforementioned connection points on the laser assembly.

In a typical preferred embodiment of the present invention, the described connections may also be made to form a dual function of furnishing the physical support for the right-hand end of the tube because the electrical leads, typically consisting of forty parallel pieces of RG58U cable, are too stiff to be supported by the assembly.

The ports 12 on each end electrode assembly provide for the emission and discharge of a suitable coolant to remove heat which accumulates in the electrodes as a result of both radiation and conduction from an oven which is typically used to raise the elemental metal to the desired elevated temperature at which it becomes metal vapor.

Accordingly, a preferred embodiment of the present invention as illustrated in FIG. 1 has a "Hot" zone operating at an elevated temperature which extends over the enclosed central portion of the assembly approximately as indicated by the elongate bracket in the drawing of FIG. 1.

The two end portions are evacuated so as to be thermally insulating and also have electrode assemblies which are water-cooled to operate at or near room temperature. Therefore, the windows 16 on either end of the assembly through which the laser energy emission finally emerges are operative at a "cold" range of temperatures. However, since the concept and teaching of the present invention provides that no hot metal vapor reaches the "cold" windows 16, there is no problem of hot metallic vapor condensing out upon the surfaces of the windows 16 to undesirably obscure the normally high transmissivity of the windows 16 and thereby impair the efficiency of operation by attenuating the laser energy which is generated within the tube.

Internal details of the two substantially identical electrode assemblies 11 shown in FIG. 1 are illustrated in the partial cross-sectional view FIG. 2.

The plasma tube, in the form of the central enclosed section 10 of the assembly, extends to the right in FIG. 2 beyond the electrode 20 as is shown in FIG. 2 and includes a connecting port 14 for the purpose of connecting a vacuum system and evacuating the interior of the enclosed end sections which are contiguous to the enclosed central section of the assembly.

The tubular portion 10 of the enclosed central section of the assembly which may be in the form of quartz tubing (extending from its numerical designation to the right in the illustration of FIG. 2) is sealed to the water-cooled connecting sleeve assembly 21 by an O-ring 22 of suitable material such as Viton which coacts with the pressure limiting ring 23 and the threaded collar 24 to affect the seal.

The connecting sleeve 21 is sealed to an electrode support tube 25 by a Viton O-ring 26, which combination functions in coaction with a pressure limiting ring 27 and threaded collar 28. A phosphor bronze ring 29 serves to insure positive electrical connection between threaded collar 28 and the electrode support tube 25 so as to prevent possible sparking or arcing which might, over a period of time, damage the O-ring 26 and thereby render the seal ineffective.

Connection between the previously mentioned 1.5 mil platinum plasma tube jacket 17 as illustrated in FIG. 1 (not shown in FIG. 2) is made by extending the foil between the O-ring pressure limiting ring 23 and the threaded collar 24.

The end of the electrode support tube 25 which may, for example, be fabricated of a suitable material such as Inconel 600, is sealed against the atmosphere by a quartz Brewster window 30 through the use of a suitable low temperature vacuum cement. In FIG. 2 the "hot" zone of the assembly extends generally to the left from approximately the plane marked A—A.

The ports 12 (which are the same as the ports in FIG. 1 identified by the numerical designation 12) accommodate the admission of a suitable coolant into a cooling cavity 31 which is annular in form and performs a cooling function so that all components of the assembly to the right of the surface of the threaded collar 24 are substantially cooler than the portion of the assembly to its left; the described zone is therefore designated as the "cold" portion of the assembly.

The tubular electrode 32 is fabricated with a threaded portion designated 33 in FIG. 2 so that it can be attached and secured within the internal diameter of the end of the electrode support tube 25. Electrode 32 is locked in a secure position of attachment to the electrode support tube 25 by a suitable lock nut 34.

The right hand end of the circular opening within the electrode 32 is sealed by a window 35 made of suitable material such as sapphire, for example. By optically polishing the sapphire window 35 to an accuracy of about 1/2 wavelength at 5,000A, sealing against excessively rapid escape of the metallic vapor is accomplished. No additional sealing material is employed.

The window 35 is held in place by the compressive force applied by a pressure tube 36 and three extension rods, such as the one illustrated at 37, which transmit resilient forces provided by three associated phosphor bronze springs 38 (only one of which is shown). The phosphor bronze springs 38 are held in proper position by a tube 39 and the springs 38 are capable of maintaining proper resilient properties because they are outside the "hot" zone of the assembly.

The spherical surfaces 40 of the electrode 32 and the conical inner surface 41 of the quartz plasma tube 10 constitute a high temperature seal for separating the metallic vapor contained within the enclosed central portion of the plasma tube 10 from the vacuum condition within the hollow portions of the electrode assembly produced by the action of a suitable vacuum system 14.

The conical inner surfaces 41 of the plasma tube 10 are ground and polished to a suitable angle such as a 45° taper, for example, and a ridged conical sealing ring 42 fabricated of suitable material, such as five mil sheet platinum, forms the annular seal between the spherical surfaces 40 of the electrode 32 and the polished, ground, conical surfaces 41 of the end portion of the plasma tube 10. A split Inconel 600 plasma tube support ring 43 provides appropriate sealing force through an external clamping mechanism (not shown). A suitable asbestos pad 44 may be positioned between the outside conical surface of the plasma tube 10 and the split support ring 43.

Evacuation of the enclosed center portion of the plasma tube 10 prior to start up of the laser assembly may be accomplished by removing the force on snap ring 45 so that the entire electrode support arm and electrode assembly previously described may be moved to the right, disengaging the internal seal previously formed between the spherical surfaces 40 of the electrode 32 and the polished internal conical surfaces 41 of the end portion of the plasma tube 10.

Conversely, sealing off of the metallic vapor is accomplished by external clamping force applied between the split ring 43 and the snap ring 45, causing the electrode support tube 25 to slide through the O-ring 26 to the left. This seal is ordinarily sufficient under normal operative conditions to prevent the admission of atmosphere during the closure process.

During pump out, gaseous vapor may pass through and between the spherical surfaces 40 and the conical surfaces 41 and out the vacuum system through the port 14. The pump out operation may be accomplished more speedily by carrying out the process simultaneously at both ends of the assembly.

Those skilled and knowledgeable in the pertinent art will therefore appreciate that the concept and teaching of the present invention provides that the portion of a metal vapor laser assembly operating at an elevated temperature includes both metal-to-glass seals and window seals which isolate the metallic vapor, enabling the windows to operate at the elevated temperature, and obviating the prior art type of condition where the hot metal vapor tended to condense out on the cooler windows.

Moreover, the provision of end sections which are evacuated in order to thermally isolate and insulate the "hot" windows from the exterior windows which are operated at a cold or room temperature, gives effect to the efficient transmission of laser energy and is also a part of the inherent concept by which hot metal vapor is not permitted to reach the "cold" windows.

An ancillary but equally important aspect of evacuating the end sections is the fact that the pressure differential across the first or innermost windows is minimized, virtually eliminating unwanted leakage into the enclosed central section of the assembly which contains the metallic vapor.

Additionally, the concept of the present invention provides metal-to-glass seals which, because of their unique configuration and dimensioning, obviate the necessity for stringent alignment as may otherwise result from expansion and contraction phenomena, for example.

Thus, the multiple advantages of the concept and teaching of the present invention result in a highly advantageous metallic vapor laser assembly which overcomes many of the more troublesome disadvantages of known and prior art assemblies intended to accomplish comparable results.

Obviously many modifications and variations of the present invention are possible in the light of the above teachings. It is therefore to be understood that within the scope of the appended claims the invention may be practiced otherwise than as specifically described.

What is claimed is:

1. A metallic vapor laser assembly comprising:
   an enclosed central section of circular tubing maintained at an elevated temperature sufficient to retain a selected metallic element in its vapor state and having a conical portion at each end;
   a hollow electrode positioned at each end of said enclosed central section in contact with the metallic vapor, and having a substantially spherically shaped end portion received in each said conical portion,
   said electrodes being connected to a source of electrical energy for generating an electrical discharge therebetween and raising said metallic vapor to a state of excitation causing laser energy emission;
   a conically shaped ring configured to be received between the conical portion at each end of said enclosed central section and the spherically shaped end portion of each electrode, and having a deformable annulus thereon for forming a pressure-tight seal;
   first windows substantially transparent to said laser energy emission and supported in said electrodes for retaining said metallic vapor therebetween,
   said first windows being maintained substantially at said elevated temperatures; and
   second windows substantially transparent to said laser energy emission and positioned outwardly from said first windows along the axis of said laser energy emission and defining enclosed end sections contiguous to said enclosed central section,
   said second windows being maintained at a temperature substantially lower than said elevated temperature and
   said enclosed end sections being substantially evacuated.

2. A metallic vapor laser assembly as claimed in claim 1 wherein said second windows are supported and positioned at the Brewster angle.

3. A metallic vapor laser assembly as claimed in claim 1 wherein said first windows are retained in position by spring-loaded means.

4. A metallic vapor laser assembly as claimed in claim 1 wherein said electrodes are water-cooled.

5. A metallic vapor laser assembly as claimed in claim 1 wherein said electrodes are hollow to permit the passage of said laser energy emission therethrough.

6. A metallic vapor laser assembly as claimed in claim 1 wherein said conical portion at each end of said circular tubing has a ground surface.

7. A metallic vapor laser assembly as claimed in claim 1 wherein said annulus comprises a ridged portion of said conically shaped ring.

* * * * *